US005528770A

United States Patent [19]

Castilla et al.

[11] Patent Number: 5,528,770

[45] Date of Patent: Jun. 18, 1996

[54] SELF-LOCKING BELT CLIP FOR SELECTIVE CALL RECEIVERS AND METHOD THEREFOR

[75] Inventors: Jorge N. Castilla, Lake Worth; Jeffrey S. King, Boynton Beach; Randall S. Pennington, Palm City, all of Fla.

[73] Assignee: Motorola Inc., Schaumburg, Ill.

[21] Appl. No.: 254,726

[22] Filed: Jun. 6, 1994

[51] Int. Cl.$^{6}$ .................................. H04B 1/08; A45F 5/02

[52] U.S. Cl. ............................ 455/351; 455/90; 224/269; 224/667; 340/825.44

[58] Field of Search ................................ 455/89, 90, 100, 455/128, 347–351; 224/252, 271, 272, 163, 269; 340/825.55, 311.1

[56] References Cited

U.S. PATENT DOCUMENTS

| | | | |
|---|---|---|---|
| D. 329,749 | 9/1992 | Scheid . | |
| 5,261,122 | 11/1993 | Otsuki et al. | 455/351 X |
| 5,261,583 | 11/1993 | Long et al. | 224/252 |
| 5,379,490 | 1/1995 | Wandt | 455/351 |

FOREIGN PATENT DOCUMENTS

| | | | |
|---|---|---|---|
| 0298759 | 1/1989 | European Pat. Off. | 455/89 |
| 2-86222 | 3/1990 | Japan | 455/90 |
| 5-122127 | 5/1993 | Japan | 455/90 |
| 6-177810 | 6/1994 | Japan | 455/351 |

*Primary Examiner*—Chi H. Pham
*Attorney, Agent, or Firm*—Keith A. Chanroo

[57] ABSTRACT

A selective call receiver (40) is provided which has a receiver (66) for receiving a message to be presented to a user, a housing enclosing the receiver, and a holster (330) slidably coupled to the housing. The holster (330) has a belt clip (310) pivotably coupled to the holster (330). The belt clip (310) has a first end (312) for securing the holster (330) to the user, and a second end (314) for pivoting the belt clip (310) away from the holster (330). A self-locking clip (300) is coupled to the holster (330). The self-locking clip (300) contacts or butts the housing of the selective call receiver (40) wherein the housing forces the self-locking clip (300) against the belt clip (310) for locking the belt clip (310) in position.

13 Claims, 2 Drawing Sheets

SELF-LOCKING BELT CLIP FOR SELECTIVE CALL RECEIVERS AND METHOD THEREFOR

FIELD OF THE INVENTION

This invention relates in general to belt clips, and more specifically, to a self-locking belt clip for selective call receivers.

BACKGROUND OF THE INVENTION

Selective call receivers are typically secured to the user by use of a belt clip. The belt clip, in one embodiments, is coupled to the rear of the housing of the selective call receiver. Generally, the belt clip is spring loaded, preferably at the coupling, to allow the user to engage and disengage the belt clip by applying a force to pivot the belt clip so that the selective call receiver including the belt clip can be removed and replaced. In another embodiment, the selective call receivers are housed in a holster. The holster includes the belt clip attached at the rear, and once the holster is attached to the user, the selective call receiver can be removed from the holster while the holster remains secured to the belt of the user. The holster makes it easy for the user to engage and disengage the selective call receiver from her person without constantly disengaging and engaging the belt clip simply by slidably removing and replacing the selective call receiver from its holster while the belt clip remains engaged.

Far too many people, however, lose their selective call receivers because the belt clip can become open while the users are performing many of their day-to-day activities, for example while sitting down or when the users bump into objects. In these day-to-day activities, sufficient force can be applied to the belt clip which causes it to open. The selective call receiver thereafter can become dislodged from its secured (or carried) position.

Thus, what is needed is a method and apparatus for securing the selective call receiver to the user which prevents the selective call receiver from being dislodged from its secure position.

DESCRIPTION OF A PREFERRED EMBODIMENT

Figure 1:
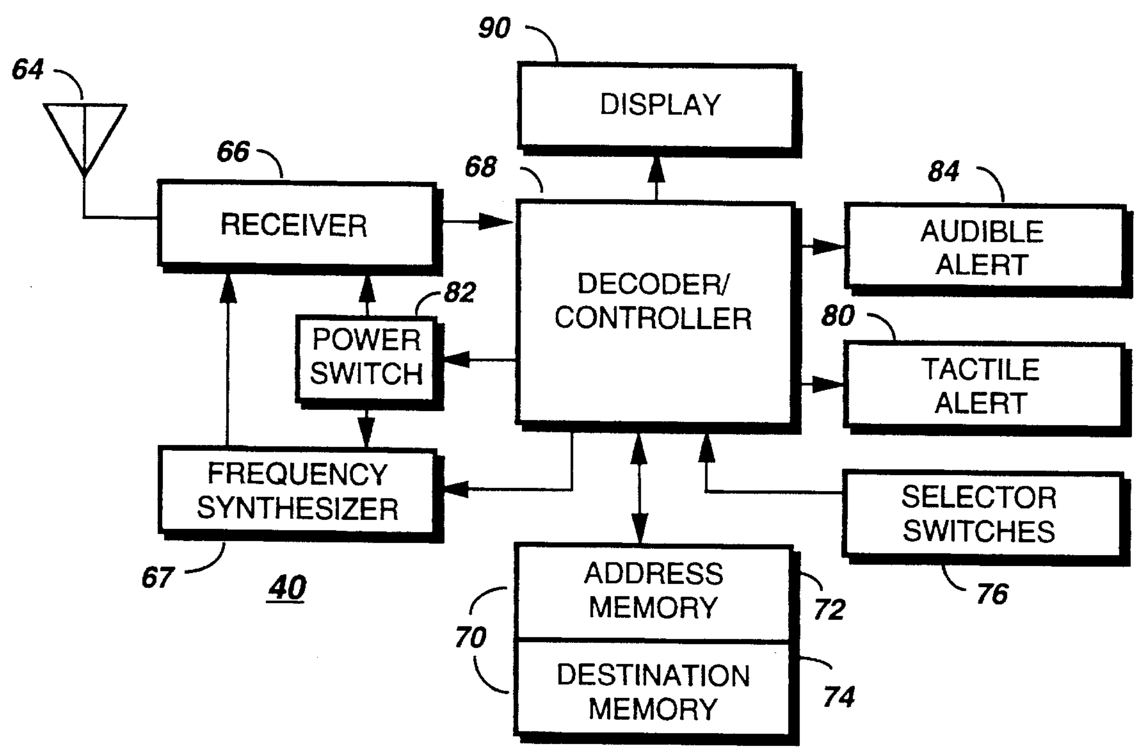
FIG. 1 is an electrical block diagram of a selective call receiver in accordance with the preferred embodiment of the present invention.

Referring to FIG. 1, an electrical block diagram of the selective call receiver 40 is shown in accordance with the preferred embodiment of the present invention. The selective call receiver 40 comprises an antenna 64 for intercepting transmitted radio frequency (RF) signals that are coupled to the input of a receiver 66. The receiver 66 provides for reception of transmissions on a single reception frequency, or reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as a tactile alerting device 80. The tactile alerting device 80 preferably provides a silent vibratory output alerting the subscriber that the destination selected is being approached.

The addresses assigned to the selective call receiver 40 for use in the selective call communication system are stored in an address memory 72 portion of memory 70. The decoder/controller 68 then controls the generation by the frequency synthesizer 67 of the selective call communication system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 2:
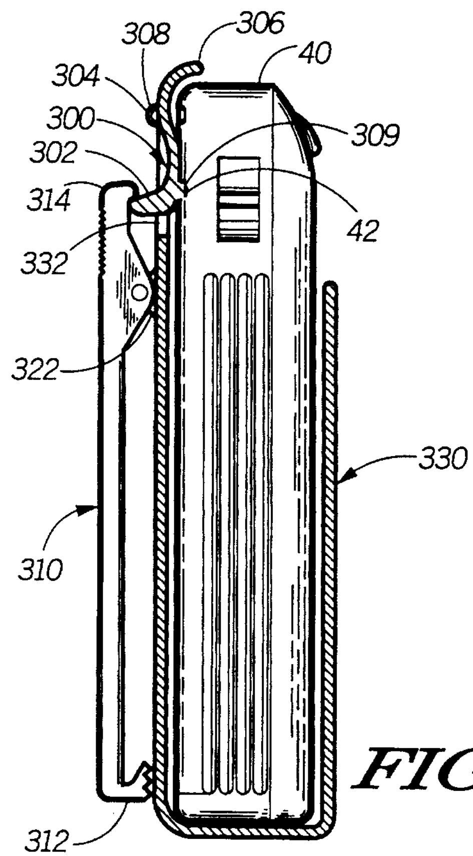
FIGS. 2 and 3 are sectional side elevation views of the selective call receiver and a holster illustrating the self-locking belt clip in accordance with the preferred embodiment of the present invention.
Figure 3:
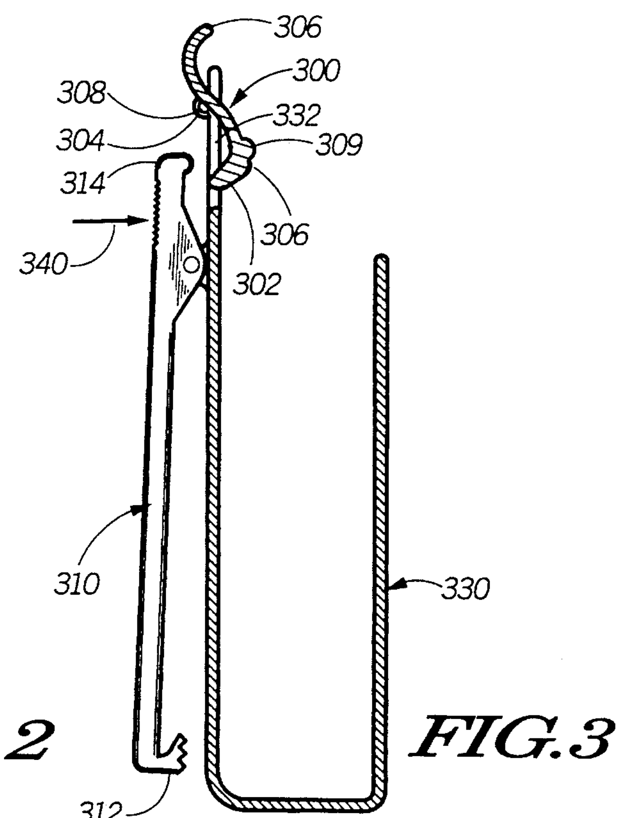

Referring to FIG. 2 and 3, sectional side elevation views of the housing of the selective call receiver are shown illustrating a self-locking clip in accordance with the preferred embodiment of the present invention. Specifically, FIG. 2 illustrates the self-locking clip 300 engaging a belt-clip 310 when the selective call receiver 40 is inserted (slidably) in the holster 330, and FIG. 3 illustrates the self-locking clip 300 being disengaged from the belt-clip 310 (in its open position) when the selective call receiver 40 is removed from the holster 330. The self-locking clip 300 comprises preferably a substantially "S" shaped mechanism which is rotatably coupled at its center 304 to the holster 330 and spring loaded in its open position (or disengaging position). The rotatably coupled center 304 of the self-locking clip includes a spring 308 and a pin (not shown) to force the self-locking clip 300 to its open (or disengaged) position when the selective call receiver 40 is removed from the holster 330. A first lower end of the self-locking clip 300 is substantially angular formed into a hammer 302 which rotates (or oscillates) between its open and locked (engaged) positions. Accordingly, an opening 332 in the rear of the holster 330 is shown which permits the self-locking clip 300 to pass therethrough for securing the belt-clip 310 in its locked position. Therefore, when the selective call receiver 40 is slidably coupled within the holster 330, the selective call receiver 40 forces the hammer 302 of self-locking clip 300 through the opening 332 for locking the belt clip 310 in the closed position. The hammer 302 butts, or moves, in its locked position, substantially close to, an upper end 314 of the belt clip 310 to prevent the belt clip 310 from opening until the selective call receiver 40 is removed and the self-locking clip 300 retracts substantially within the holster 330 to its open position (FIG. 3). The belt clip 310, as is well known to those skilled in the art, is secured 322 to permit a force 340 applied to the upper end 314 for rotating the belt clip 310 to its open position. In its open position, the lower end 312 is removed from contacting with the holster 330 to enable the holster 330 to be removed from or replaced in its carrying position.

As exemplified by FIG. 3, when the selective call receiver 40 is removed from the holster 300, the self-locking clip 330 moves to its the open position substantially inside the holster 330 under the force of the spring 308. As is shown, a second upper end 306 of the self-locking clip 300 is shaped to be substantially angular to cover (or secure) the selective call receiver 40 to prevent the selective call receiver 40 from being forced out of the holster 330 when the self-locking clip is in its locked position. With the substantially angular end 306, the user has to tilt the selective call receiver 40 forward when removing to enable ease of removing the selective call receiver 40 from the holster 330.

Figure 4:
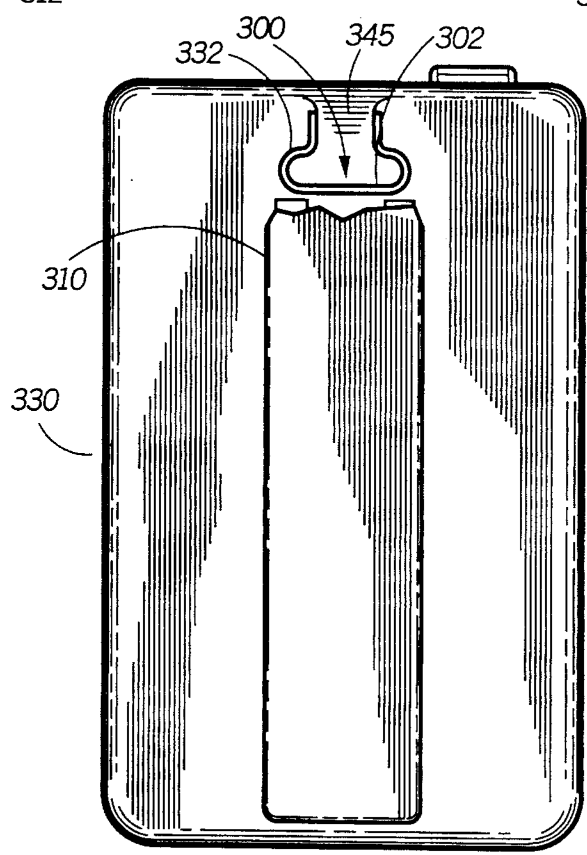
FIG. 4 is a rear side elevation of the holster illustrating the self-locking belt clip in accordance with a second embodiment of the present invention.

Referring to FIGS. 3 and 4, the first lower end (the hammer) 302 of the self-locking clip 300 includes a bump 309 which couples to the selective call receiver 40 that can have a groove 42 to mate with the bump 309 to further secure the selective call receiver 40 within the holster 330.

Operationally, the belt clip 310, at its coupling or pivot 332, is permitted to rotate to its open position by applying a force 340 to the belt clip 310 for inserting a belt or part of a user's clothing between the lower end 312 and the holster 330 so that the holster can be secured to the user. The selective call receiver 40 thereafter can be inserted and removed while the holster 330 is secured to the user by the belt clip 310. In this way, when the belt clip 310 is secured to the user and the selective call receiver 40 is placed within the holster 330 and the belt clip 310 is prevented from being opened by the self-locking clip 300 which butts the upper end 314 of the belt clip. Therefore, with this invention, the selective call receiver 40 and its holster are prevented from becoming loose and being dislodged from the user because the self-locking clip locks the belt clip to prevent it from opening while the selective call receiver 40 is within the holster.

Figure 5:
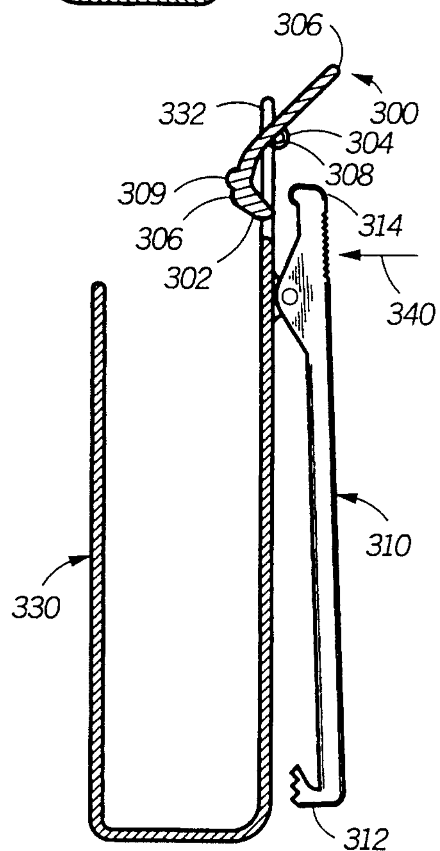
FIG. 5 is a sectional side elevation of the holster illustrating the self-locking belt clip according to a second embodiment of the present invention.

Referring to FIGS. 4 and 5, a rear side elevation and a sectional side of the holster respectively illustrating the self-locking belt clip are shown in accordance with a second embodiment of the present invention. The opening 332 in the rear of the holster 330 is shown which permits the self-locking clip 300 to pass therethrough for securing the belt-clip 310 in its locked position. The self-locking clip 300 is substantially "L" shaped or angular. As described above, when the selective call receiver 40 is slidably coupled within the holster 330, the selective call receiver 40 forces the lower end (the hammer) 302 of self-locking clip 300 through the opening 332 for locking the belt clip 310 in the closed position. Specifically, the hammer 302 contacts (butts) or is forced substantially close to upper end 314 of the belt clip 310 to prevent the belt clip 310 from opening while the selective call receiver 40 is within the holster 330.

The self-locking belt clip 300 and the holster 330 preferably manufactured from a molded polycarbonate material which is molded together to form a coupling 345 between self-locking clip 300 and the holster 330. The self-locking clip 300 is manufactured and molded to the holster 330 wherein, at the coupling 345, the self-locking clip 300 is molded to rigidly but movably (or rotatably) coupled 345 with the holster 330 while the self-locking clip 300 resides in holster 330. In its open position, the self-locking clip 300 exerts a force against being pushed to its locked position. The rotatably rigid coupling 345, when forced to its locked position by the selective call receiver 40, is able to return to the inside the holster 330 (open or unlocked position) when the selective call receiver 40 is slidably removed therefrom (like a cantilever). The cantilevered coupling 345 formed between the self-locking clip 300 to the holster 330 can also be formed with by any other suitable materials and methods of coupling known to one skilled in the art.

Operationally, the hammer 302 moves through the opening 332 of the holster 330 in a cantilever manner when the self-locking clip 300 is forced to its locked position by the selective call receiver 40 being slidably inserted within the holster 330. With the selective call receiver 40 in the holster 330, the hammer 302 of the self-locking clip 300 is forced against the upper end 314 of the belt-clip 310 which is pivoted or rotatably coupled to the back of the holster 330 to permit the cantilevered action as is well known to one skilled in the art.

According to the present invention, when the selective call receiver 40 is in the holster 330, the belt clip 310 cannot be removed from the user because the selective call receiver forces the self-locking clip 300 through the opening 332 to contact with the upper end of the belt-clip. The self-locking clip therefore restricts the belt-clip 310 from opening which prevents the belt clip from becoming loose or being dislodged while the selective call receiver 40 is within the holster.

In summary, a selective call receiver is provided which comprises a receiver for receiving a message to be presented to a user; a housing enclosing the receiver; and a holster slidably coupled to the housing. The holster comprises a belt clip pivotably coupled to the holster. The belt clip comprises a first end for securing the holster to the user, and a second end for pivoting the belt clip away from the holster; and a self-locking clip coupled to the holster. The self-locking clip contacts or butts the housing of the selective call receiver wherein the housing forces the self-locking clip against the belt clip for locking the belt clip in position.

We claim:

1. A selective call receiver comprising:

a receiver for receiving a message to be presented to a user;

a housing enclosing the receiver; and a holster slidably coupled to the housing, the holster comprising:

a belt clip pivotably coupled to the holster, the belt clip comprises a first upper end for disengaging the belt clip by pivoting a second lower end of the belt clip away from the holster; and a self-locking clip coupled to the holster for cantilevering between a first position and a second position, the self-locking clip contacts the housing wherein the housing forces the self-locking clip against said first upper end of the belt clip for locking the belt clip in a closed position.

2. The selective call receiver according to claim I wherein the self-locking clip is formed as an "L" shaped cantilevered clip having a first lower end for moving between a first position and second position.

3. The selective call receiver according to claim 2 wherein the first lower end of the self-locking clip further comprises a bump.

4. The selective call receiver according to claim 3 further comprises a groove on the housing for coupling with the bump to secure the self-locking clip against the belt clip.

5. The selective call receiver according to claim 2 wherein the first lower end of the self-locking clip comprises a hammer which passes through an opening in the holster for locking an upper end of the belt clip.

6. The selective call receiver according to claim 1 wherein the self-locking clip further comprises:

an "S" shaped clip having:

a substantially angular upper end for securing the selective call receiver with the holster; and a substantially angular lower end for passing through an opening in the housing for securing the belt clip in an engaged position.

7. A method for self-locking a selective call receiver to a user comprising the steps of:

(a) pivotably coupling a belt clip to a holster, the belt clip comprises a lower end for securing the holster to the user, and an upper end for pivoting the lower end of the belt clip away from the holster;

(b) rotatably coupling a self-locking clip to the holster;

(c) slidably coupling the selective call receiver within the holster thereby engaging and forcing the self-locking clip against the upper end of the belt clip for securing the belt clip in a closed position.

8. The method according to claim 7 further comprising a step of providing a bump on the lower end of the self-locking clip.

9. The method according to claim 8 further comprising the step of mating the bump with a groove on a housing of the selective call receiver secures the selective call receiver within the holster and butts the self-locking clip against the belt clip.

10. The method according to claim 7 wherein the step of slidably coupling further comprises a step of forcing the lower end of the self-locking clip which comprises a hammer through an opening in the holster for locking the belt clip.

11. A selective call receiver comprising:

a receiver for receiving a message to be presented to a user;

a housing enclosing the receiver; and a holster slidably coupled to the housing, the holster comprising:

a belt clip pivotably coupled to the holster, the belt clip comprises a first end for disengaging the belt clip by pivoting a second end of the belt clip away from the holster; and a self-locking clip coupled to the holster; the self-locking clip comprising:

a first lower end which comprises a hammer passing through an opening in the holster for contacting with and locking the belt clip in a locked position when the housing is slidably coupled to the holster;

a second upper end rigidly but rotatably coupled to the holster for enabling a cantilevered action of the self-locking clip; and a bump coupled to the first lower end wherein the bump mates with a groove on the housing for securing the self-locking clip against the belt clip.

12. The selective call receiver according to claim 11 wherein the self-locking clip further comprises:

an "S" shaped clip having:

a substantially angular upper end for securing the selective call receiver with the holster; and a substantially angular lower end for passing through an opening in the housing for securing the belt clip in an engaged position.

13. The selective call receiver according to claim 11 wherein the self-locking clip is formed as an "L" shaped clip having the first lower end cantilevering between a first unlocked position and a second locked position.

* * * * *